United States Patent
Wagner et al.

[15] 3,650,902
[45] Mar. 21, 1972

[54] PROCESS FOR THE STABILIZATION AND PURIFICATION OF L-ASPARAGINASE

[72] Inventors: Otto Wagner; Klaus Bauer, both of Wuppertal-Elberfeld; Wilfried Kaufmann, Wuppertal-Vohwinkel; Erich Rauenbusch; Alfred Arens; Eckart Irion, all of Wuppertal-Elberfeld, Germany

[73] Assignee: Farbenfabriken Bayer Aktiengesellschaft, Leverkusen, Germany

[22] Filed: May 28, 1969

[21] Appl. No.: 828,601

[30] Foreign Application Priority Data

May 29, 1968 Germany.....................P 17 67 617.4
July 16, 1968 Germany.....................P 17 92 043.3
Nov. 7, 1968 Germany.....................P 18 07 447.0
Nov. 9, 1968 Germany.....................P 18 08 042.7

[52] U.S. Cl. .........................................................195/66 A
[51] Int. Cl......................................................... C07g 7/02
[58] Field of Search .................................................195/66 A

[56] References Cited

UNITED STATES PATENTS 3,050,445   8/1962   Damaskus et al.........................195/63

3,227,626   1/1966   Baumgarten et al......................195/66

OTHER PUBLICATIONS

Rowley et al., Biochem. Biophy. Research Comm. Vol. 28 pp. 160–165 (1967)
Dixon et al. Enzymes, 2nd Ed. 1964 pp. 36–37.

*Primary Examiner*—Lionel M. Shapiro
*Attorney*—McCarthy, Depaoli, O'Brien & Price

[57] ABSTRACT

L-asparaginase is obtained in a highly purified, pyrogen free and stabilized form from a crude aqueous solution thereof, by adding to said solution an amino acid, such as glycine, adjusting the pH of the solution to from 7.0 to 9.2, preferably in the presence of a lower aliphatic alcohol, such as methanol, then heating the solution for a period of from 1 to 5 days at a temperature up to 65° C., preferably between 40° C. to 61° C., thereby denaturing the inactive accompanying proteins without affecting the L-asparaginase. The precipitated, denatured proteins are then removed, as by centrifuge, the enzyme enriched solution then adjusted to a pH between 4.5 and 5.5 and fractionally precipitated with a 50 percent polyethylene glycol solution, the precipitate then washed with acetone and dried.

4 Claims, 1 Drawing Figure

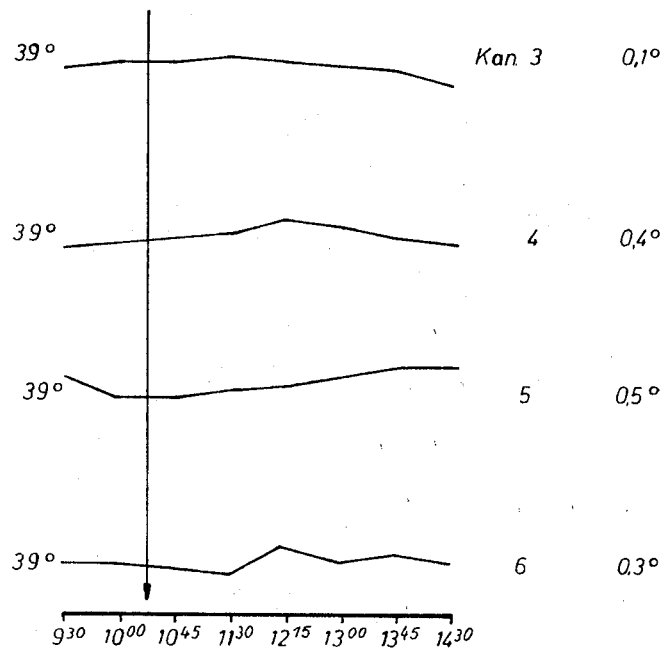

PROCESS FOR THE STABILIZATION AND PURIFICATION OF L-ASPARAGINASE

FIELD OF THE INVENTION

The present invention is, in general, directed to a process for the production of the enzyme, L-asparaginase, in a highly purified form. More specifically, the process is concerned with procedures for obtaining the L-asparaginase in such purified form as to be free of pyrogens which normally accompany the enzyme, in which the enzyme is stabilized against the effects of heat, extreme pH conditions and surface denaturization and in such concentration as to enable the production of the enzyme in crystalline form.

DESCRIPTION OF THE PRIOR ART

L-asparaginase is a known enzyme which is obtained by extraction of E. coli cells [H. A. Campbell, L. T. Mashburn, E. A. Boyse, L. J. Old, *Biochemistry* 6 (1967) pages 721 to 730].

L-asparaginase has recently become recognized as an effective remedy against such tumors as require L-asparagin for their growth. However, clinical applications have encountered difficulties due to limitations in prior known methods for the preparation of the enzyme in the large quantities and of sufficient purity required. The prior known methods for obtaining the enzyme resulted in a product which was accompanied by pyrogenic substances which have been found particularly difficult to eliminate.

From protein chemistry it is known that in working with enzymes it is necessary to take several kinds of denaturing into account: for example, heat denaturing, denaturing through extreme pH values and surface denaturing [*J. Biol. Chem.* 118 (1937) pages 163 to 175]. The heat denaturing generally occurs when proteins are heated to temperatures above 40° C. The temperature at which denaturing takes place differs for the individual proteins due to the varying solidity of the structure. A similar situation is true for the denaturing through too high or too low pH values. Surface denaturing takes place by interaction with a surface or by spreading at a phase boundary surface, or when the hydrogen bridges of the protein are broken up. The latter case can for example easily be caused through foaming by shaking or by the injection of inert gases. Even a single decanting of an enzyme solution from one vessel to another can cause a reduction of activity. The surface denaturing is especially in evidence at the isoelectric point, as is known from the literature. It is furthermore known that the susceptibility of enriched proteins increases with an increasing degree of purity and that highly purified preparations are especially susceptible to denaturing phenomena.

DESCRIPTION OF THE INVENTION

This invention is an improvement over copending application Ser. No. 786,901, filed Dec. 26, 1968 (Attorney Docket Number FB-68-4, 5, 6), which is directed towards the enrichment of crude L-asparaginase solutions by the fractional precipitation of the same with aqueous solutions of polyalkylene glycols, preferably polyethylene glycol.

It has now been found that substantial benefits can be obtained in the production of L-asparaginase which is either substantially pyrogen-free or contains a small amount of pyrogenic components by treatment of the same with amino acids in a specified way prior to the above referred-to treatment with the aqueous solutions of polyalkylene glycol.

While we have found that L-asparaginase shows surprising thermal stability in the presence of glycine, thereby permitting its separation from heat sensitive proteins and further that the enzyme is precipitated at its isoelectric point from polyethylene glycol, neither of these methods when used alone, are as effective for pyrogen removal as the process of this invention.

It has now been further found that the combination of the above-mentioned methods and their modification leads to a substantial freeing of L-asparaginase from the contaminating pyrogens. It has been further found that the addition of 4 to 40 percent of a lower aliphatic alcohol, preferably methanol, to the amino acid results in further substantial denaturing of the foreign proteins.

It is surprising that in the case of the purification process according to the invention only the inactive accompanying proteins, but not the L-asaparaginase, are denaturized, since, as is well known, most enzymes are thermo labile.

We have further found that polyethylene glycol stabilizes the L-asparaginase against various kinds of denaturing. This result is surprising, since polyethylene glycol shows no pronounced surface active effect, which perhaps could prevent the surface denaturing by suppressing the foaming. In contrast to the glycine above disclosed as stabilizer, polyethylene glycol admittedly has free electron pairs on the ether oxygen atoms, nevertheless practically no hydrogen atoms capable of hydrogen bridge bonding. This stabilizing effect occurs with asparaginases of various degrees of purity. The concentration of the added polyethylene glycol can vary within wide limits. The stabilizing effect is clearly in evidence already with an addition of 10 percent in relation to the L-asparaginase used.

The polyethylene glycol can be added both in solution, preferably aqueous, but also alcoholic, and in solid form to the L-asparaginase solution.

The above disclosed stabilization of the enzyme with glycine is notably reinforced by the addition of polyethylene glycol.

In accordance with the process of the invention an amino acid, preferably glycine, in amounts of 1 to 10 percent, for example three percent by weight, is added to 0.5 to 15 percent aqueous solution of L-asparaginase at temperatures of −10 to +65° C. preferably between 40° C. to 61° C. The L-asparaginase used is preferably such as has been brought to a degree of purity of about 160 to 220 U/mg. by precipitation from ethylene glycol. The pH value of this solution is adjusted to between 7.0 and 9.2, preferably from eight to nine. Preferably 10 percent by volume of methanol is included in the solution, which is then maintained at 50° C. for 1 to 5 days. The supernatant solution is adjusted to a pH between 4.5 and 5.5 preferably 5.2 and precipitated with polyethylene glycol. The material so obtained consists of enriched, pyrogen free or low pyrogen L-asparaginase.

Since the L-asparaginase unit (U) has not yet been defined in complete agreement in the art, it was determined in the examples as follows:

One unit of L-asparaginase is that quantity which, at 37°C., and at pH 7.2, cleaves off 1 /μMol ammonia from L-asparagin in one minute.

The invention will be further illustrated by the following examples:

EXAMPLE 1

Fifty grams raw asparaginase with activity of 3.2 U/mg. are dissolved in glycine buffer having a pH of 8.5 and are heated for one hour to 60°C. The resulting mixture which contains much denaturized, inactive protein is then centrifuged at 6,000 r.p.m. until it is clear and is fractionated with acetone. The portion which is precipitated upon addition of 40 to 45 percent of acetone amounts to 3.9 grams. It has an activity of 31.6 U/mg.

Eighteen and six-tenths grams of enriched L-asparaginase, gathered from several denaturization mixtures, are dissolved in 380 ml. of a 3M urea solution, adjusted with 1N sodium hydroxide to a pH of 8.5 and fractionated with 50 weight percent aqueous polyethylene glycol solution. The portion precipitated after addition of 45 to 60 ml. is centrifuged off and washed with acetone and dried. Yield: 4.2 grams; U/mg.: 104.

A solution of 4.0 grams of this sample is added to 80 ml. didistilled water, adjusted with 1N hydrochloric acid to a pH of 5.2 and is fractionated with an aqueous polyethylene glycol solution. The portion deposited after addition of 25 to 30 ml. is centrifuged off after standing for 20 minutes at room temperature and, after standing for 2 more hours under acetone, is washed with additional acetone to yield 1.2 grams of L-asparaginase having an activity of 203 U/mg.

This sample turned out to be a uniformly and thoroughly crystallized material. It was possible to achieve a recrystallization of this sample by precipitating a solution of the crystals in water, at pH 4.9, with a polyethylene glycol solution, and also by precipitating the same aqueous solution with acetone.

The crystals were flat prisms which began to decompose at 289° C. and were completely decomposed at 292° C.

EXAMPLE 2

Five grams raw asparaginase (3.2 U/mg.) were dissolved in 100 ml. of a one percent alanine solution which had been adjusted with sodium hydroxide to a pH of 8.5 and was heated for 15 minutes to 60° C. The mixture, which contained much denaturized protein was purified through centrifuging at 6,000 r.p.m. It contained the full asparaginase activity.

Through further treatment involving fractional precipitation with polyethylene glycol as set forth in Example 1, it is possible to obtain enriched or crystallized L-asparaginase from this denaturization mixture.

EXAMPLE 3

Five grams L-asparaginase with a specific activity of about 170 U/mg. substance are dissolved in one liter of water at room temperature, the portions which have remained insoluble being centrifuged off. Ten grams of glycine are added, while stirring slowly, at room temperature to the solution obtained in that manner. Stirring is continued until complete solution, the solution is frozen and subsequently lyophilized. After addition of the glycine, the pH value amounts to 5.2.

EXAMPLE 4

One hundred grams asparaginase with a specific activity of 100 U/mg. are dissolved in one liter water. About 40 grams glycine are added and the solution adjusted to a pH of 8.9. The solution is kept for 90 hours at +50° C. and the protein thereupon precipitated is centrifuged at 6,000 r.p.m. for 20 minutes. The clear centrifuged product is adjusted to pH 5.2 with 2N HCl and fractionally precipitated with 50 percent polyethylene glycol solution. The portion precipitating after addition of about 200 ml. polyethylene glycol is centrifuged off, washed with acetone and dried.

Yield: 35 Grams with 210 U/mg. substance.

From this illustration, a product of minimum pyrogen content results.

EXAMPLE 5

One hundred g. L-asparaginase with a specific activity of 100 U/mg. are dissolved in one liter water. One hundred ml. methanol and 40 g. glycine are added and the solution adjusted to pH eight to nine. The solution is held for 90 hours at 50° C. and the protein thereupon precipitated is centrifuged for 20 minutes at 6,000 r.p.m. The clear centrifuged product is adjusted with 2N HCl to pH 5.2 and fractionally precipitated with 50 percent polyethylene glycol solution. The part precipitated after the addition of about 200 ml. polyethylene glycol is centrifuged, washed with acetone and dried.

Yield: 33 g. with 218 U/mg. substance.

EXAMPLE 6

Procedure as in Example 5, but 200 ml. methanol are added.

EXAMPLE 7

Procedure as in Example 5, but 100 ml. ethanol are added to the solution.

EXAMPLE 8

An L-asparaginase preparation was fractionated in a column with dextran gel and the L-asparaginase containing fraction was dialyzed. The solution contained 12,400 U with a specific activity of 251 U/mg. protein.

The first half of this solution was freeze dried. A preparation with an activity of 5,050 U (=81 percent of the activity employed) and a specific activity of 202 U/mg. protein was obtained.

The second half of the above solution was mixed with 0.1 ml. of a 50 percent solution of polyethylene glycol and then freeze dried. The yield amounted to 6,100 U (=98 percent of the activity employed) with a specific activity of 244 U/mg. protein.

EXAMPLE 9

Five ml. of an 0.1 percent solution of L-asparaginase with a content of 146 U/mg. in 0.2 n acetate buffer, pH 5.0, were used each time in the experiment as follows:

a. Pure argon was blown in for 90 minutes in such a manner that intensive foaming occurred.
b. Procedure as under a, but the 100mg. polyethylene glycol of molecular weight 1,500 had first been added to the solution.
c. The solution was shaken for three hours in a closed vessel.
d. Procedure as under (c), but 100 mg. polyethylene glycol had first been added to the solution.
e. The solution was stored for three hours in the refrigerator (control).

In determining the content of the solutions (a) to (e), the following values were obtained:

a. U/ml. = 15
b. U/ml. = 140
c. U/ml. = 35
d. U/ml. = 138
e. U/ml. = 146

EXAMPLE 10

Five ml. of a 0.1 percent solution of L-asparaginase with a content of 146 U/mg. in $n/15$ phosphate buffer, pH 7.0, were treated each time analogous with Example 9, experiments (a) and (b).

In determining the content the following values were found:

a. U/ml. = 76
b. U/ml. = 145

EXAMPLE 11

An L-asparaginase preparation with 100 U/mg. dry weight was dissolved in 0.1 $n$ trisbuffer (pH 8.0) in a concentration of one mg/ml. Six ml. of this solution were diluted with 0.5 ml. water and heated in a temperature controlled vessel to 55° C. At the same time 6.0 ml. of the same L-asparaginase solution were mixed with 0.3 ml. water and 0.2 ml. of a 50 percent solution of polyethylene glycol in water and exposed to the same temperature application. After certain periods samples were drawn from the mixtures and tested for their activity. The results are reported in Table 1.

An analogous experiment was undertaken with the same preparation at 60° C. the results are likewise contained in Table 1.

EXAMPLE 12

An L-asparaginase preparation with 100 U/mg. was dissolved in a concentration of one mg./ml. in 0.1 $n$ trisbuffer (pH 8.0). To 6.0 ml. samples of this solution were added either 0.5ml. water or 0.5 ml. of aqueous solution containing 50, 100, or 200 mg. polyethylene glycol. The solution was heated for 80 minutes to 55° C. The results are reported in Table 2.

EXAMPLE 13

An L-asparaginase preparation with 100 U/mg. was dissolved in a concentration of one mg/ml. in 0.1 n trisbuffer (pH 8.0). To each six ml. of this solution was added:
a. 0.3 ml. water
b. 0.2 ml. water and 0.1 ml. polyethylene glycol (50 percent in water)
c. 0.2 ml. glycine solution (100 mg/ml.)
d. 0.1 ml. polyethylene glycol (50 percent in water) and 0.2 ml. glycine solution (100 mg/ml.)

The solutions were heated for 80 minutes to 60° C. and then tested for their content of L-asparaginase. The results are reported in Table 3.

TABLE 1
Heat application of L-asparaginase in the presence of polyethylene glycol

| Duration of application (minutes) | Temperature (°C.) | Activity of the L-asparaginase (u./ml.) | |
|---|---|---|---|
| | | Without additive | With polyethylene glycol |
| 0 | 55 | 68 | 104 |
| 20 | 55 | 74 | 103 |
| 40 | 55 | 62 | 101 |
| 60 | 55 | 61 | 94 |
| 80 | 55 | 43 | 94 |
| 0 | 60 | 91 | 96 |
| 20 | 60 | 49 | 69 |
| 40 | 60 | 33 | 48 |
| 60 | 60 | 26 | 40 |
| 80 | 60 | 16 | 32 |

NOTE.—L-asparaginase with 100 u./mg., dissolved in 0.1 n trisbuffer (pH 8.0); concentration 0.92 mg./ml. The addition of polyethylene glycol amounted to 15.1 mg./ml.

TABLE 2
Stability of L-asparaginase as a function of the amount of polyethylene glycol

| Concentration of polyethylene glycol, mg./ml. | Ratio of polyethylene glycol to the enzyme | Activity prior to heating, u./ml. | Activity after 80 minutes at 55° C., u./ml. | Activity in percent of starting value |
|---|---|---|---|---|
| 0 | 0 | 92 | 43 | 47 |
| 7.5 | 8.2 | 98 | 86 | 88 |
| 15.0 | 16.3 | 98 | 94 | 96 |
| 30.0 | 32.6 | 98 | 91 | 93 |

NOTE.—The L-asparaginase preparation had a specific activity of 100 u./mg. dry weight. The concentration in the solution was 0.92 mg./ml.

TABLE 3
Stability of L-asparaginase in the presence of several stabilizers

| | Activity of the L-asparaginase after 80 minutes heating to 60° C. | |
|---|---|---|
| | U./ml. | Percent of the starting value |
| L-asparaginase alone | 14 | 15 |
| L-asparaginase with polyethylene glycol | 44 | 48 |
| L-asparaginase with glycine | 52 | 57 |
| L-asparaginase with polyethylene glycol and glycine | 83 | 90 |

What is claimed is:

1. The process for preparing pyrogen free L-asparaginase, comprising heating pyrogen-contaminated L-asparaginase in the presence of glycine at a pH between 7.0 and 9.2 at a temperature of from 40° C. to 61° C., freeing the solution of precipitated impurities, and precipitating the purified L-asparaginase with a polyethylene glycol solution at a pH of 4.5 to 5.5.

2. In the process for the purification of aqueous solutions containing crude L-asparaginase wherein said L-asparaginase is fractionally precipitated by the addition of an aqueous solution of a polyalkylene glycol, the improvement which comprises pretreating said crude aqueous solutions of L-asparaginase by heating said aqueous solution in the presence of glycine at a pH between 7.0 and 9.2 at a temperature from 40° to 61° C.

3. The process as defined in claim 2 wherein the pH of the solution is about 8.5 and the solution is maintained at 60° C. for one hour.

4. The process for the purification of L-asparaginase having an activity of about 100 U/mg. which comprises adding glycine to an aqueous solution of the L-asparaginase, adjusting the pH to 8.9, maintaining the said solution for 90 hours at 50° C., separating the protein thus precipitated by centrifuge, adjusting the centrifuged product to a pH of 5.2, fractionally precipitating the same with a 50 percent aqueous polyethylene glycol solution, separating the precipitate, washing the same with acetone and drying.

* * * * *

UNITED STATES PATENT OFFICE
CERTIFICATE OF CORRECTION

Patent No. 3,650,902          Dated March 21, 1972

Inventor(s) Otto Wagner et al

It is certified that error appears in the above-identified patent and that said Letters Patent are hereby corrected as shown below:

Column 5, Table 1, under the heading "Without Additive," the first entry therein should be -- 86 -- not "68".

Signed and sealed this 5th day of September 1972.

(SEAL)
Attest:

EDWARD M. FLETCHER, JR.
Attesting Officer

ROBERT GOTTSCHALK
Commissioner of Patents

FORM PO-1050 (10-69)